United States Patent
Pettersson et al.

(10) Patent No.: US 10,711,756 B1
(45) Date of Patent: Jul. 14, 2020

(54) METHODS AND SYSTEM FOR STARTING A VEHICLE

(71) Applicant: Ford Global Technologies, LLC, Dearborn, MI (US)

(72) Inventors: Lars Niklas Pettersson, Novi, MI (US); Samuel Johnson, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/259,246

(22) Filed: Jan. 28, 2019

(51) Int. Cl.
| | |
|---|---|
| *F02N 11/00* | (2006.01) |
| *F02N 11/08* | (2006.01) |
| *F02N 11/06* | (2006.01) |
| *B60W 10/08* | (2006.01) |
| *B60W 10/06* | (2006.01) |

(52) U.S. Cl.
CPC ......... *F02N 11/0844* (2013.01); *B60W 10/06* (2013.01); *B60W 10/08* (2013.01); *F02N 11/06* (2013.01); *F02N 2200/121* (2013.01)

(58) Field of Classification Search
CPC ................. F02N 11/0844; F02N 11/06; F02N 2200/121; B60W 10/06; B60W 10/08
See application file for complete search history.

(56) References Cited

U.S. PATENT DOCUMENTS

| | | | |
|---|---|---|---|
| 5,020,506 A * | 6/1991 | Ozawa .................... | F02P 1/086 123/631 |
| 9,827,974 B1 | 11/2017 | Boyko et al. | |
| 9,845,782 B1 * | 12/2017 | Bernier .................... | F02N 11/08 |
| 2003/0140881 A1 * | 7/2003 | Makajima ............... | F02B 61/02 123/179.3 |
| 2007/0204827 A1 * | 9/2007 | Kishibata ................ | F02N 11/08 123/179.5 |
| 2008/0105230 A1 * | 5/2008 | Kishibata ............... | F02D 41/062 123/179.5 |
| 2008/0201064 A1 * | 8/2008 | DiGonis ................ | B60W 10/06 701/110 |
| 2009/0020100 A1 * | 1/2009 | Sakaigaki ............. | F02D 41/009 123/350 |
| 2010/0145562 A1 | 6/2010 | Moran | |
| 2017/0067407 A1 * | 3/2017 | Dudar ..................... | F02D 41/08 |
| 2019/0242351 A1 * | 8/2019 | Matsuyama ............ | H02P 27/06 |

* cited by examiner

*Primary Examiner* — Thomas N Moulis
(74) *Attorney, Agent, or Firm* — David Kelley; McCoy Russell LLP

(57) ABSTRACT

Systems and methods for operating an internal combustion engine that may be automatically stopped and started are described. In one example, an engine is rotated in a reverse direction after an engine stop so that a belt integrated starter/generator may rotate the engine in a forward direction and utilize the inertia of the engine to rotate trough top-dead-center compression stroke, thereby starting the engine.

20 Claims, 4 Drawing Sheets

US 10,711,756 B1

METHODS AND SYSTEM FOR STARTING A VEHICLE

FIELD

The present description relates to methods and a system for starting an engine that includes a belt integrated starter/generator.

BACKGROUND AND SUMMARY

A vehicle may include a belt integrated starter/generator (BISG) to start an internal combustion engine and to charge a battery. The BISG may also provide torque to the engine when the engine is operating (e.g., combusting fuel and rotating) to boost driveline output. A BISG and its accompanying battery may be sized to provide robust engine starting when the engine stops at a position that requires a larger amount of torque to rotate the engine in a forward direction and to achieve a cranking speed that is sufficient for engine starting during cold ambient conditions. However, such a BISG may not be cost effective for some engine applications. Therefore, it may be desirable to provide a way of starting an engine with a reduced amount of torque so that a smaller BISG and battery may reliably start an engine without having a large excess torque capacity.

The inventors herein have recognized the above-mentioned issues and have developed an engine operating method, comprising: rotating an engine crankshaft in a forward direction when combusting air and fuel in the engine; rotating the engine crankshaft in a reverse direction to a crankshaft position at which a torque to turn the engine exceeds a predetermined output torque of a belt integrated starter/generator (BISG) in response to the engine being stopped; and holding the engine stopped at the crankshaft position via supplying current to the BISG.

By rotating the engine crankshaft in a reverse direction that is opposite a direction that the engine crankshaft rotates when it is combusting fuel, it may be possible to provide the technical result of starting an engine with a BISG and battery that has a lower output torque capacity. In particular, the engine crankshaft may be rotated in a reverse direction and then stopped. Once an engine start request is issued, the BISG may rotate the engine crankshaft in a forward direction to start the engine. The engine crankshaft angular rotational distance at which the engine exerts a higher compression and friction losses when the engine is rotated in the forward direction may be increased by first rotating the engine in a reverse direction. By increasing the crankshaft angular rotational distance before compression and friction losses increase when the engine is rotated, it may be possible for the engine to reach a higher cranking speed. Rotating the engine at a higher cranking speed may allow the engine's inertia to help the BISG rotate the engine trough top-dead-center compression stroke of a cylinder so that the engine may be started with less BISG torque as compared to if the engine stopped near top-dead-center compression stroke of a cylinder.

The present description may provide several advantages. In particular, the approach may improve engine starting robustness. Further, the approach may reduce system cost by enabling robust engine starting via a BISG with lower torque output capacity. In addition, the approach may be implemented in several ways that may help to reduce electrical power consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to starting an engine via a BISG. In particular, the present description is related to adjusting an engine stopping position and conserving electrical power so that the possibility of starting an engine may be improved. Further, adjusting the engine stopping position may enable robust engine starting via a BISG with lower output torque capacity. The engine may be of the type shown in FIG. 1. The engine may be included in a driveline of the type shown in FIG. 2. The engine may be stopped and started according to the sequence shown in FIG. 3. The engine may be operated according to the method of FIG. 4.

Figure 1:
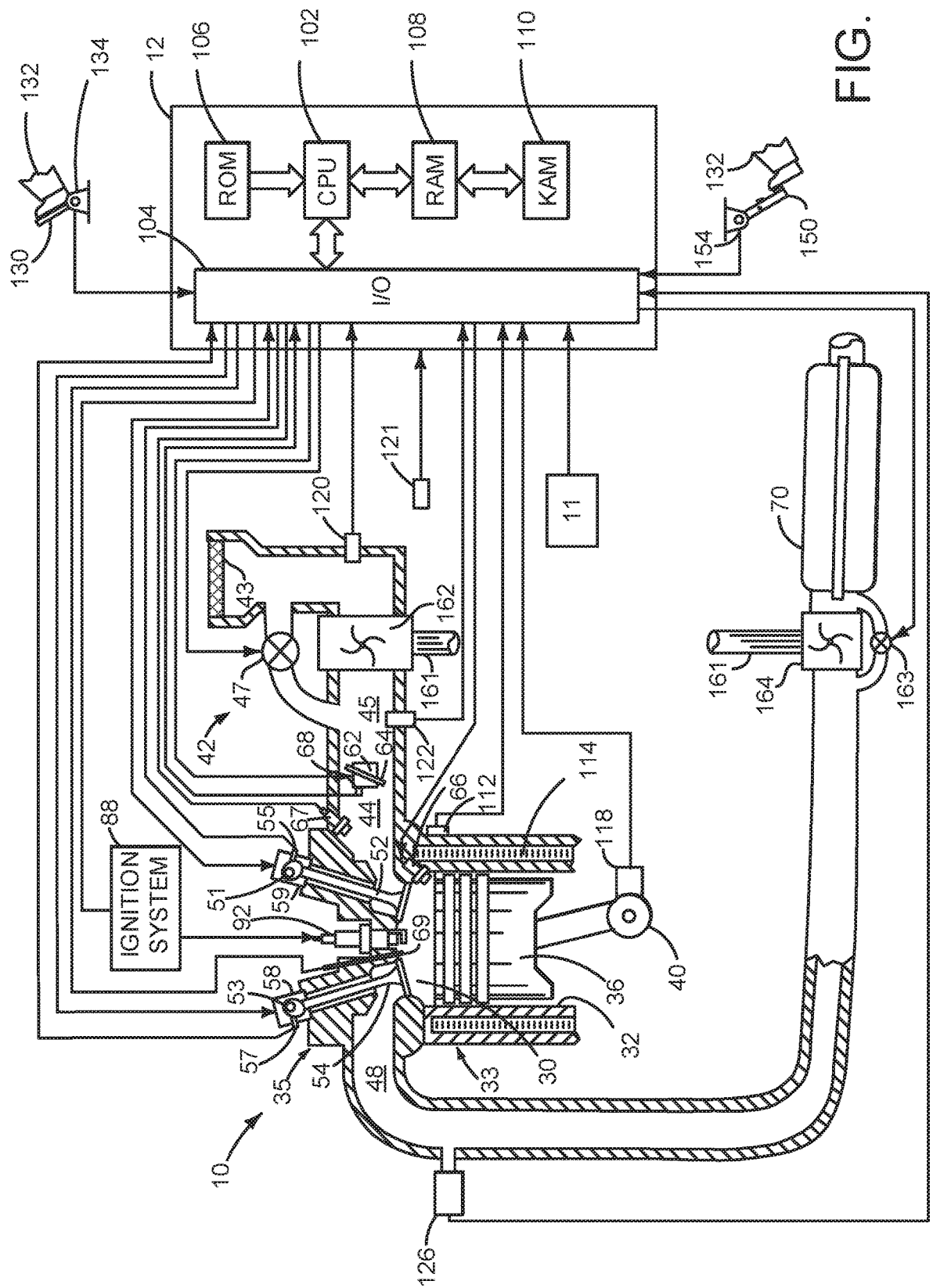
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices. Pressure in combustion chamber 30 may be sensed via pressure sensor 69.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 can include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; barometric pressure from barometric pressure sensor 121; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known input/output device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
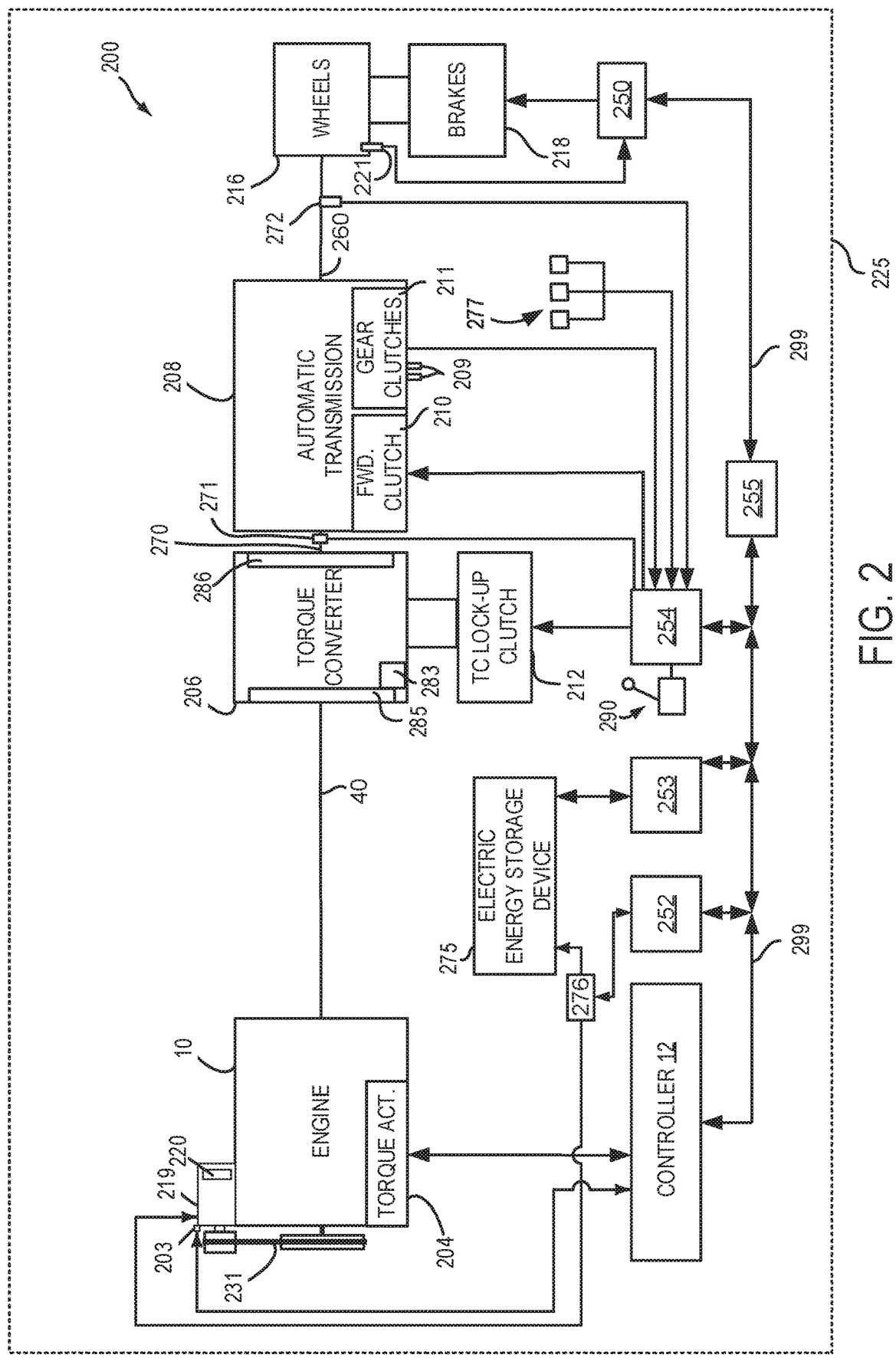
FIG. 2 is a schematic diagram of a vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and belt integrated starter/generator (BISG) 219. Engine 10 may be started via BISG 219. A speed of BISG 219 may be determined via optional BISG speed sensor 203. BISG 219 may also be referred to as an electric machine, motor, and/or generator. Further, power of engine 10 may be adjusted via power actuator 204, such as a fuel injector, throttle, etc. Electric machine controller 252 may operate BISG 219 in a generator mode or a motor mode via commanding inverter 276. The inverter 276 may convert direct current (DC) from the electric energy storage device 275 into alternating current (AC) to power the BISG 219. Alternatively, the inverter 276 may convert alternating current into direct current to charge the electric energy storage device 275.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 via inverter 276. BISG 219 may operate as a generator supplying electrical power to electric energy storage device 275 via inverter 276.

An engine output power and BISG output power may be transmitted to torque converter turbine 286, which outputs engine power to transmission input shaft 270. Transmission input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate forward clutch 210 and gear clutches 211. Pump 283 is driven via impeller 285, which rotates at a same speed as engine crankshaft 40.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling conditions before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the BISG 219. Vehicle system controller 255 requests the engine power from engine controller 12 and the BISG power from electric machine controller 252. If the BISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging or regeneration power (e.g., a negative BISG power) may be requested while a non-zero driver demand power is present. Vehicle system controller 255 may request increased engine power to overcome the charging power to meet the driver demand power.

In response to a request to decelerate vehicle 225, vehicle system controller 255 may provide a negative desired wheel power (e.g., desired or requested powertrain wheel power) based on vehicle speed and brake pedal position. Vehicle system controller 255 then allocates a fraction of the negative desired wheel power to the BISG 219 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and BISG 219 may supply a negative power to transmission input shaft 270, but negative power (e.g., power absorbed from the driveline) provided by BISG 219 and engine 10 may be limited by transmission controller 254 which outputs a transmission input shaft negative power limit (e.g., not to be exceeded threshold value). Further, negative power of BISG 219 may be limited (e.g., constrained to less than a threshold negative threshold power) based on operating conditions of electric energy storage device 275, by vehicle system controller 255, or electric machine controller 252. Any portion of desired negative wheel power that may not be provided by BISG 219 because of transmission or BISG limits may be allocated to engine 10 and/or friction brakes 218 so that the desired wheel power is provided by a combination of negative power (e.g., power absorbed) via friction brakes 218, engine 10, and BISG 219.

Accordingly, power control of the various powertrain components may be supervised by vehicle system controller 255 with local power control for the engine 10, transmission 208, BISG 219, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from BISG 219 by adjusting current flowing to and from field and/or armature windings 220 of BISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), BISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1–N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative BISG power does not cause the wheel power limit to be exceeded. For example, if controller 250 issues a negative wheel power limit of 10 N-m, BISG power is adjusted to provide less than 10 N-m (e.g., 9 N-m) of negative power at the wheels, including accounting for transmission gearing.

Thus, the system of FIGS. 1 and 2 provides for a system, comprising: an engine including a belt integrated starter/generator (BISG) and a crankshaft; and a controller including executable instructions stored in non-transitory memory to rotate the engine in a reverse direction via the BISG providing a predetermined amount of torque to the engine in response to an engine stop, the BISG rotating the engine crankshaft in the reverse direction to a crankshaft position at which the torque to rotate the engine exceeds the predetermined amount of torque. The system further comprises additional instructions to reduce torque of the BISG according to a pressure in the cylinder after the engine stops rotating in the reverse direction. The system further comprises additional instructions to rotate the engine crankshaft in a forward direction via the BISG. The system further comprises additional instructions to automatically stop the engine. The system includes where the predetermined amount of torque is sufficient to rotate the engine in the reverse direction.

In another representation, the system of FIGS. 1 and 2 may provide for a system, comprising: an engine including a belt integrated starter/generator (BISG); and a controller including executable instructions stored in non-transitory memory to rotate the engine in a reverse direction via the BISG providing a predetermined amount of torque to the engine in response to an engine stop, instructions to rotate the engine in a forward direction in response to a request to crank the engine while rotating the engine in the reverse direction, and instructions to hold the engine at a crankshaft position where the engine stops after rotating the engine in the reverse direction, the predetermined amount of torque being non-zero and insufficient to rotate the engine past top-dead-center compression stroke of a cylinder of the engine. The system further comprises additional instructions to reduce torque of the BISG according to a pressure in the cylinder. The system includes where the engine is rotated in the forward and reverse directions via the BISG. The system further comprises additional instructions to automatically stop the engine. The system includes where the predetermined amount of torque is sufficient to rotate the engine in the reverse direction.

Figure 3:
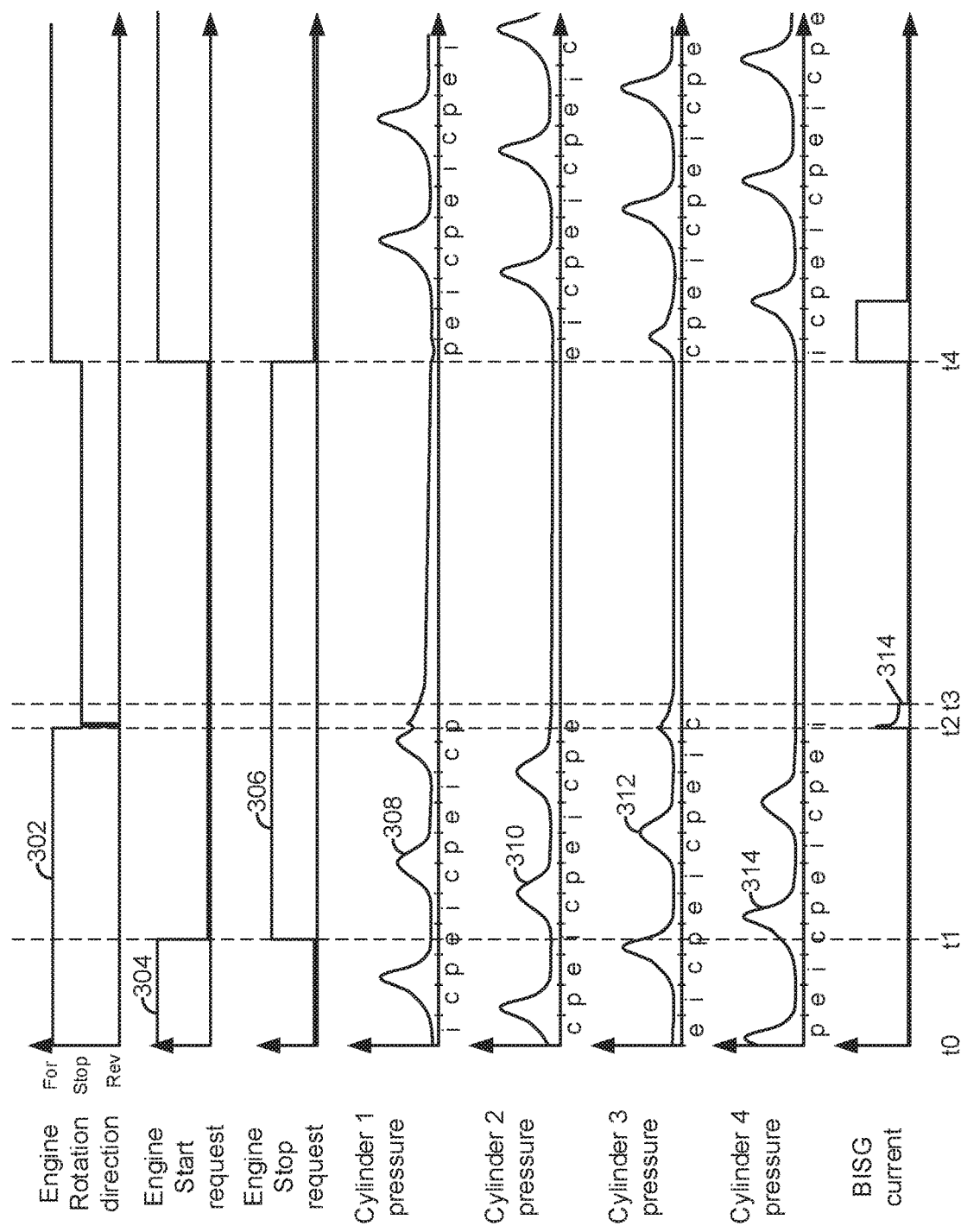
FIG. 3 shows an example engine operating sequence according to the method of FIG. 4.
Figure 4:
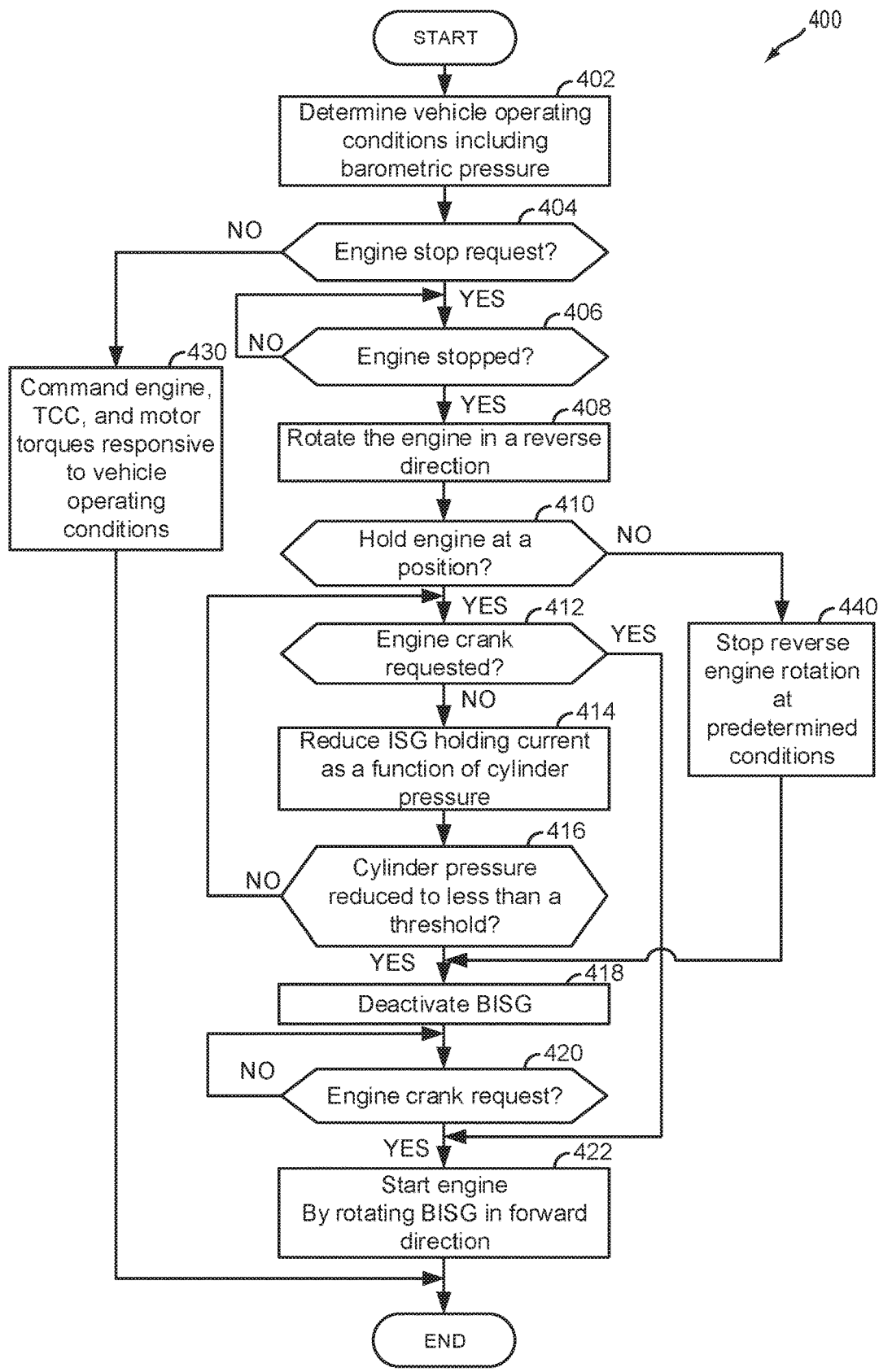
FIG. 4 shows a method for operating an engine.

Referring now to FIG. 3, plots of a prophetic engine operating sequence according to the method of FIG. 4 and the system of FIGS. 1 and 2 are shown. The plots are aligned in time and occur at a same time. The vertical lines at t0-t4 show events at particular times of interest. The engine operating sequence is for a four cylinder four stroke engine having a firing order of 1-3-4-2. Each horizontal axis of each plot is shown referenced to strokes of the respective cylinders, except between time t2 and time t4, which is shown as time.

The first plot from the top of FIG. 3 is a plot of engine crankshaft rotational direction versus time. The engine crankshaft is rotating in a forward direction (e.g., clockwise when looking from the front of the engine) when trace 302 is at a higher level indicted by "For." The engine crankshaft is rotating in a reverse direction (e.g., counter clockwise when looking from the front of the engine) when trace 302 is at a lower level indicted by "Rev." The engine crankshaft is stationary when trace 302 is at a middle level indicted by "Stop." Trace 302 represents the engine crankshaft rotational direction state.

The second plot from the top of FIG. 3 is a plot of an engine start request state versus time. The engine start request is asserted when trace 304 is at a higher level near the vertical axis arrow. The engine is being started or is already running when trace 304 is at the higher level. The engine start request is not asserted when trace 304 is at a lower level near the horizontal axis. Trace 304 represents the engine start request state.

The third plot from the top of FIG. 3 is a plot of an engine stop request state versus time. The engine stop request is asserted when trace 306 is at a higher level near the vertical axis arrow. The engine is being stopped or is already stopped when trace 306 is at the higher level. The engine stop request is not asserted when trace 306 is at a lower level near the horizontal axis. Trace 306 represents the engine stop request state.

The fourth plot from the top of FIG. 3 is a plot of pressure in cylinder number one versus time. The pressure in cylinder number one increases in the direction of the vertical axis arrow. The horizontal axis represents the strokes of cylinder number one and the small vertical lines along the horizontal axis represent top-dead-center and bottom dead-center locations for cylinder number one, except between times t2 and t4, which are shown as time. Trace 308 represents pressure in cylinder number one.

The fifth plot from the top of FIG. 3 is a plot of pressure in cylinder number two versus time. The pressure in cylinder number two increases in the direction of the vertical axis arrow. The horizontal axis represents the strokes of cylinder number two and the small vertical lines along the horizontal axis represent top-dead-center and bottom dead-center locations for cylinder number two, except between times t2 and t4, which are shown as time. Trace 310 represents pressure in cylinder number two.

The sixth plot from the top of FIG. 3 is a plot of pressure in cylinder number three versus time. The pressure in cylinder number three increases in the direction of the vertical axis arrow. The horizontal axis represents the strokes of cylinder number three and the small vertical lines along the horizontal axis represent top-dead-center and bottom dead-center locations for cylinder number three, except between times t2 and t4, which are shown as time. Trace 312 represents pressure in cylinder number three.

The seventh plot from the top of FIG. 3 is a plot of pressure in cylinder number four versus time. The pressure in cylinder number four increases in the direction of the vertical axis arrow. The horizontal axis represents the strokes of cylinder number four and the small vertical lines along the horizontal axis represent top-dead-center and bottom dead-center locations for cylinder number four, except between times t2 and t4, which are shown as time. Trace 314 represents pressure in cylinder number four.

The eighth plot from the top of FIG. 3 is a plot of BISG current versus time. The BISG current increases in the direction of the vertical axis arrow. The horizontal axis represents time and time increases from the left side of the plot to the right side of the plot. Trace 316 represents BISG current.

At time t0, the engine is operating (e.g., rotating and combusting fuel) as indicated by the engine start request being asserted. The engine is rotating in a forward direction and an engine stop request is not asserted. Pressures in cylinders 1-4 increase during the compression stroke of the respective cylinders and are reduced during the expansion strokes of the respective cylinders. The BISG current is zero to indicate that the BISG is not operating in a generator or a motor mode.

At time t1, the engine stop request is asserted and the engine start request is withdrawn. The engine continues to rotate in a forward direction and BISG current remains zero. The cylinder pressures reflect pressures in the engine's cylinders.

Between time t1 and time t2, combustion ceases in the engine's cylinders and pressures in the cylinders is reduced. The engine continues to rotate in the forward direction and the engine stop request remains asserted. The engine start request is not asserted. The BISG current remains zero.

At time t2, the engine stops and shortly thereafter, it is rotated in the reverse direction via the BISG so that the crankshaft angular distance between the final engine stopping position before engine restart and next cylinder to reach its top-dead-center compression stroke when the engine is rotated in a forward direction is increased. The increased crankshaft distance may allow the BISG to accelerate the engine to a greater speed so that the engine's inertia may be used to rotate the engine through the next cylinder's top-dead-center compression stroke. In this example, the engine stops during the expansion or power stroke of cylinder number one, which is the compression stroke of cylinder number three. Cylinder number two is on its exhaust stroke and cylinder number four is on its intake stroke when the engine is first stopped.

Between time t2 and time t3, the engine is rotated in the reverse direction by the BISG applying a predetermined amount of torque to the engine. The predetermined amount of torque may be adjusted as a function of barometric pressure so that the engine stopping position may be less influenced by barometric pressure. Further, the BISG torque to rotate the engine may be limited or prevented from exceeding a threshold amount of torque (e.g., an amount of torque to rotate the engine through top-dead center compression of a cylinder, such as rotating the engine from 20 crankshaft degrees after top-dead-center compression stroke to 20 crankshaft degrees before top-dead-center compression stroke when rotating the engine in the reverse direction) so that excess electrical power is not consumed while rotating the engine in the reverse direction.

Pressure in cylinder number one increases since the engine is rotated toward top-dead-center compression stroke of cylinder number one when the engine is rotated in the reverse direction. Pressure in cylinder number three decreases since the engine is rotated away from top-dead-center compression stroke of cylinder number three when the engine is rotated in the reverse direction. The engine is held in a crankshaft position where the torque to rotate the engine crankshaft just exceeds the predetermined amount of torque that is applied by the BISG to the engine crankshaft. The BISG torque is gradually reduced as the pressure in cylinder number one is reduced, which allows the engine crankshaft to remain stationary while BISG electrical energy consumption is reduced.

At time t3, pressure in cylinder number one is reduced to less than a threshold pressure at which pressure in the cylinder may cause the engine crankshaft to rotate. The amount of current supplied to the BISG is reduced to zero in response to pressure in cylinder number one being less than a threshold pressure at which pressure in the cylinder may cause the engine crankshaft to rotate. By reducing BISG current, energy consumption by the BISG may be reduced. The engine crankshaft remains stopped and an engine start request is not asserted between time t2 and time t3. Further, BISG current is zero and cylinder pressures decline between time t2 and time t3.

At time t3, an engine start request is made and the engine stop request is withdrawn. The BISG current is increased in response to the engine start request and the BISG begins to rotate the engine crankshaft in a forward direction. After time t3, the cylinder pressures begin to rise and the engine begins to combust air and fuel. The BISG current is reduced when the engine is started.

In this way, an engine may be rotate in a reverse direction in a way that conserves electrical energy. Further, by rotating the engine in the reverse direction, the cranking duration before a first top-dead-center compression stroke may be increased so that the engine's inertia may be applied to rotate the engine trough top-dead-center compression stroke (e.g., the highest compression torque during engine starting) of the cylinder nearest its top-dead-center compression stroke when engine cranking for engine starting begins.

Referring now to FIG. 4, a flow chart of a method for operating an engine to reduce BISG output torque requirements is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world. Method 400 may be executed when engine 10 of FIG. 1 is operating (e.g., combusting fuel and rotating).

At 402, method 400 determines vehicle operating conditions. Vehicle operating conditions may include but are not limited to vehicle speed, engine speed, engine temperature, electric energy storage device state of charge (SOC), barometric pressure, and accelerator pedal position. Method 400 proceeds to 404.

At 404, method 400 judges if an engine stop request is present. An engine stop may be generated via the human driver, or alternatively, the engine stop request may be generated automatically via the controller 12 responsive to vehicle operating conditions and without input from a human driver to stop the engine via a dedicated input that has a sole purpose of starting and/or stopping the engine (e.g., a key switch or pushbutton). A request to stop the engine may be generated automatically via controller 12 in response to driver demand torque being less than a threshold torque. Further, additional conditions may be required to request an engine stop automatically (e.g., battery state of charge being greater than a threshold). If method 400 judges that an engine stop is requested, then the answer is yes and method 400 proceeds to 406. Further, fuel delivery and spark delivery to the engine may be ceased to stop the engine. If method 400 judges that an engine stop is not requested, the answer is no and method 400 proceeds to 430.

At 430, method 400 commands the engine, BISG, and TCC responsive to vehicle operating conditions including, but not limited to accelerator pedal position, vehicle speed, engaged transmission gear, and battery state of charge as is known in the art. Method 400 proceeds to exit.

At 406, method 400 judges if the engine is stopped. In one example, if the engine crankshaft position is not changing, method 400 judges that the engine is stopped. If method 400 judges that the engine is stopped, the answer is yes and method 400 proceeds to 408. Otherwise, method 400 returns to 406.

At 408, method 400 rotates the engine in a reverse direction via applying a predetermined torque from the BISG to the engine crankshaft. Alternatively, method 400 may rotate the engine in a reverse direction via applying up to but not exceeding a predetermined torque to the engine crankshaft from the BISG. The predetermined amount of torque may be adjusted as a function of barometric pressure so that the engine stopping position may be less influenced by barometric pressure. For example, the predetermined amount of torque may be increased as barometric pressure increases, and the predetermined amount of torque may be reduced as barometric pressure decreases. This may allow the BISG to exert less force when the engine is operated at higher altitudes, thereby conserving electrical power. In addition, the BISG torque to rotate the engine may be limited or prevented from exceeding a threshold amount of torque so that excess electrical power is not consumed while rotating the engine in the reverse direction. The engine is rotated in the reverse rotational direction while torque to turn the engine is less than the predetermined torque applied to the engine crankshaft by the BISG. Alternatively, the engine may be rotated in the reverse direction until predetermined conditions mentioned at 440 occur. Thus, the torque to turn the engine may prevent further rotation by the BISG in the reverse direction once torque to turn the engine crankshaft exceeds torque output via the BISG. Method 400 proceeds to 410.

At 410, method 400 judges whether or not the BISG is to hold the engine in the crankshaft position where torque to turn the engine exceeds the torque that is applied to the engine crankshaft via the BISG. In one example, method 400 may judge the BISG to hold the engine at the crankshaft position where torque to turn the engine exceeds the torque that is applied to the engine crankshaft via the BISG when the engine has been automatically stopped. In one example, method 400 may judge the BISG to not hold the engine at the crankshaft position where torque to turn the engine exceeds the torque that is applied to the engine crankshaft via the BISG when the engine has been stopped via the human driver and the battery state of charge is greater than a threshold since the battery may have sufficient power to crank the engine and achieve a quicker start. The BISG may hold the engine stopping position by applying a holding torque to the engine crankshaft, which may be realized by operating the BISG in a generator mode and supplying a regenerative torque to the engine crankshaft or operating the BISG in a motor mode and supplying a positive torque to the engine crankshaft. If method 400 judges to hold the engine crankshaft stopping position, the answer is yes, and method 400 proceeds to 412. Otherwise, the answer is no and method 400 proceeds to 440.

At 440, method 400 stops rotating the engine when predetermined conditions are met. Method 400 may stop engine rotation at a predetermined crankshaft angle (e.g., an absolute crankshaft angle relative to the next top-dead-center compression stroke to be encountered by rotating the engine in the reverse direction. In some examples, method 400 may stop reverse engine crankshaft rotation after pressure in a cylinder was decreasing and then begins to increase immediately following the cylinder pressure decrease. By stopping engine rotation in response to an amount of time since the BISG began cranking the engine after the most recent engine stop, it may be possible to conserve electrical power by not over exerting the BISG to reach a particular engine position while still improving the possibility of starting the engine. In another example, method 400 may stop reverse engine crankshaft rotation after engine rotational speed has been constant or increasing and then begins to decrease. By stopping engine rotation in response to engine crankshaft rotational speed, it may be possible to conserve electrical power by not over exerting the BISG to reach a particular engine position without having to determine cylinder pressure while still improving the possibility of starting the engine. In another example, method 400 may stop reverse engine crankshaft rotation after the engine has been rotating in the reverse direction for a predetermined amount of time since the most recent engine stop. By stopping engine rotation in response to cylinder pressure, it may be possible to conserve electrical power by not over exerting the BISG to reach a particular engine position without knowing BISG speed or cylinder pressure while still improving the possibility of starting the engine. In still another example, method 400 may stop reverse engine crankshaft rotation when the amount of BISG torque to rotate the engine crankshaft has increased by more than a predetermined percentage over the BISG torque initially applied to rotate the engine in reverse after the engine stop. By stopping engine rotation in response to a change in BISG torque, it may be possible to conserve electrical power by not monitoring time, cylinder pressure, and BISG speed while still improve the possibility of starting the engine. Engine crankshaft rotation may be stopped by ceasing to supply electrical power to the BISG.

The BISG does not hold the engine crankshaft position at 440. Rather, the engine crankshaft may rotate after the BISG ceases to supply torque to the engine due to pressure in one or more of the engine cylinders. However, if the predetermined conditions for ceasing to rotate the engine in the reverse direction are such that cylinder pressures are low, then engine rotation after the BISG ceases to supply torque to the engine crankshaft via stopping electric current flow to the BISG may be small. Method 400 proceeds to 418.

At 412, method 400 judges if engine cranking (e.g., rotating the engine crankshaft via torque supplied via the BISG when the engine is not rotating under its own power) is requested. Engine cranking may be requested via the human driver. Alternatively, the engine cranking may be requested automatically via the controller 12 in response to vehicle operating conditions and without input to a dedicated engine start/stop request device (e.g., a key switch or push button). If method 400 judges that engine cranking is requested, the answer is yes and method 400 proceeds to 422. Otherwise, the answer is no and method 400 proceeds to 414.

At 414, method 400 holds the engine crankshaft where the engine crankshaft stops rotating immediately following the reverse engine rotation. The engine reverse rotation may stop when torque to rotate the engine in the reverse direction exceeds the predetermined amount of torque that the BISG applies to the engine crankshaft. The engine crankshaft may be held in position via switching the motor to a generator mode and supplying a regenerative torque to the engine crankshaft or via continuing to supply a positive torque to the engine crankshaft while operating in the motor mode. Electrical current is supplied to the BISG to hold the engine crankshaft in position.

The amount of holding current that is applied to the engine crankshaft may be reduced as a function of pressure in one or more engine cylinders. For example, the current to hold the engine crankshaft in its position may be reduced as pressure in the cylinder is reduced. In one example, pressure in a cylinder is applied to index or reference a table of empirically determined BISG current values. The table or function outputs the BISG holding current, which decreases with decreasing pressure in the one or more engine cylinders. By decreasing BISG current, electrical energy may be conserved while engine stopping position may be maintained. Values in the table or function may be determined via stopping the engine at various positions and gradually lowering BISG current until the engine begins to mode. The table or function may be populated with the lowest BISG current levels that prevent engine crankshaft rotation. Method 400 proceeds to 416.

At 416, method 400 judges whether or not pressure in one or more engine cylinders (e.g., a cylinder that is on its expansion or power stroke) is less than a threshold pressure. If so, the answer is yes and method 400 proceeds to 418. Otherwise, the answer is no and method 400 returns to 412.

Alternatively, or in addition, method 400 may judge if a predetermined amount of time has lapsed since the engine stopped rotating in the reverse direction most recently. If so, the answer is yes and method 400 proceeds to 418. Otherwise, the answer is no and method 400 returns to 412.

In still other examples, method 400 may judge if an amount of torque applied by the BISG to the engine crankshaft is less than a predetermined threshold while maintaining the engine's crankshaft in a stopped position. If so, the answer is yes and method 400 proceeds to 418. Otherwise, the answer is no and method 400 returns to 412.

At 418, method 400 deactivates the BISG by ceasing to supply electrical current to the BISG. Method 400 proceeds to 420.

At 420, method 400 judges if engine cranking is requested. Engine cranking may be requested via the human driver. Alternatively, the engine cranking may be requested automatically in response to vehicle operating conditions and without input to a dedicated engine start/stop request device (e.g., a key switch or push button). If method 400 judges that engine cranking is requested, the answer is yes and method 400 proceeds to 422. Otherwise, the answer is no and method 400 returns to 420.

At 422, method 400 activates the BISG by supplying electrical current to the BISG and the BISG begins to rotate the engine in a forward direction. Further, the engine is supplied with spark and fuel so that the engine may be started. Method 400 proceeds to exit.

In this way, the number of engine crankshaft degrees may be increased between a crankshaft angle where an engine first starts to rotate from in a forward direction after being stopped and a crankshaft angle where a first cylinder of the engine to reach top-dead-center compression stroke after the engine was rotated in the reverse direction. By increasing the actual total number of crankshaft degrees, it may be possible to improve the possibility of starting an engine via a BISG.

Thus, the method of FIG. 4 provides for an engine operating method, comprising: rotating an engine crankshaft in a forward direction when combusting air and fuel in the engine; rotating the engine crankshaft in a reverse direction to a crankshaft position at which a torque to turn the engine exceeds a predetermined output torque of a belt integrated starter/generator (BISG) in response to the engine being stopped; and holding the engine stopped at the crankshaft position via supplying current to the BISG. The method includes where the predetermined output torque is a torque that is insufficient to rotate the engine through top-dead-compression stroke of a cylinder of the engine while rotating the engine in the reverse direction. The method further comprises adjusting the predetermined output torque in response to barometric pressure. The method includes where adjusting the predetermined output torque includes increasing the predetermined output torque in response to increasing barometric pressure.

The method includes where adjusting the predetermined output torque includes decreasing the predetermined output torque in response to decreasing barometric pressure. The method further comprises rotating the engine in the forward direction via the belt/integrated starter/generator to start the engine. The method further comprises adjusting current supplied to the BISG as a function pressure in a cylinder of the engine. The method includes where holding the engine stopped at the crankshaft position includes holding the engine at the crankshaft position for a predetermined amount of time.

The method of FIG. 4 provides for an engine operating method, comprising: rotating an engine in a forward direction when combusting air and fuel in the engine; rotating the engine in a reverse direction via a belt integrated starter/generator (BISG) to a crankshaft position at which a predetermined condition is met in response to the engine being stopped; and reducing current supplied to the BISG as a function of pressure in a cylinder of the engine in response to the predetermined condition being met. The method includes where the predetermined condition is a torque to turn the engine exceeding a predetermined output torque of a belt integrated starter/generator. The method includes where the predetermined output torque is a torque that is insufficient to rotate the engine through top-dead-center compression stroke of a cylinder of the engine. The method further comprises rotating the engine in the forward direction via the belt/integrated starter/generator to start the engine. The method includes where the predetermined condition is the engine being at a predetermined crankshaft position. The method includes where the predetermined condition is an amount of time since starting to rotate the engine in the reverse direction exceeds a threshold. The method includes where the predetermined condition is pressure in a cylinder increasing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
   rotating an engine crankshaft in a forward direction when combusting air and fuel in the engine;
   rotating the engine crankshaft in a reverse direction to a crankshaft position at which a torque to turn the engine exceeds a predetermined output torque of a belt integrated starter/generator (BISG) in response to the engine being stopped; and
   holding the engine stopped at the crankshaft position via supplying current to the BISG.

2. The method of claim 1, where the predetermined output torque is a torque that is insufficient to rotate the engine through top-dead-compression stroke of a cylinder of the engine.

3. The method of claim 2, further comprising adjusting the predetermined output torque in response to barometric pressure.

4. The method of claim 3, where adjusting the predetermined output torque includes increasing the predetermined output torque in response to increasing barometric pressure.

5. The method of claim 3, where adjusting the predetermined output torque includes decreasing the predetermined output torque in response to decreasing barometric pressure.

6. The method of claim 1, further comprising rotating the engine in the forward direction via the belt/integrated starter/generator to start the engine.

7. The method of claim 1, further comprising adjusting current supplied to the BISG as a function pressure in a cylinder of the engine.

8. The method of claim 1, where holding the engine stopped at the crankshaft position includes holding the engine at the crankshaft position for a predetermined amount of time.

9. An engine operating method, comprising:
   rotating an engine in a forward direction when combusting air and fuel in the engine;
   rotating the engine in a reverse direction via a belt integrated starter/generator (BISG) to a crankshaft position at which a predetermined condition is met in response to the engine being stopped; and reducing current supplied to the BISG as a function of pressure in a cylinder of the engine in response to the predetermined condition being met.

10. The method of claim 9, where the predetermined condition is a torque to turn the engine exceeding a predetermined output torque of a belt integrated starter/generator.

11. The method of claim 10, where the predetermined output torque is a torque that is insufficient to rotate the engine through top-dead-center compression stroke of a cylinder of the engine.

12. The method of claim 9, further comprising rotating the engine in the forward direction via the belt/integrated starter/generator to start the engine.

13. The method of claim 9, where the predetermined condition is the engine being at a predetermined crankshaft position.

14. The method of claim 9, where the predetermined condition is an amount of time since starting to rotate the engine in the reverse direction exceeds a threshold.

15. The method of claim 9, where the predetermined condition is pressure in a cylinder increasing.

16. A system, comprising:
an engine including a belt integrated starter/generator (BISG) and a crankshaft; and
a controller including executable instructions stored in non-transitory memory to rotate the engine in a reverse direction via the BISG providing a predetermined amount of torque to the engine in response to an engine stop, the BISG rotating the engine crankshaft in the reverse direction to a crankshaft position at which the torque to rotate the engine exceeds the predetermined amount of torque.

17. The system of claim 16, further comprising additional instructions to reduce torque of the BISG according to a pressure in the cylinder after the engine stops rotating in the reverse direction.

18. The system of claim 17, further comprising additional instructions to rotate the engine crankshaft in a forward direction via the BISG.

19. The system of claim 16, further comprising additional instructions to automatically stop the engine.

20. The system of claim 16, where the predetermined amount of torque is sufficient to rotate the engine in the reverse direction.

* * * * *